UNITED STATES PATENT OFFICE.

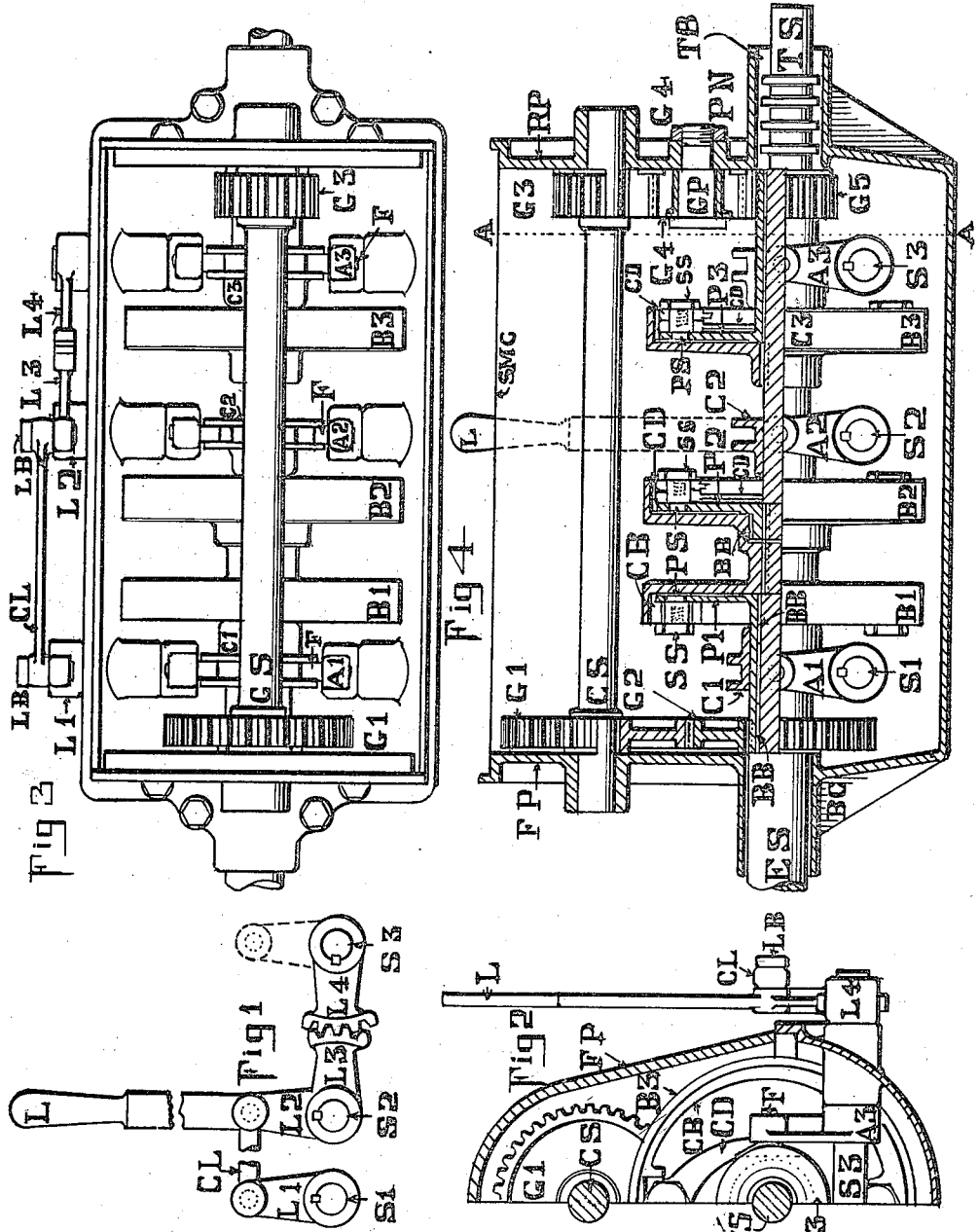

ERDIX N. ROUNDS, OF OWENSBORO, KENTUCKY.

TRANSMISSION-GEARING.

1,278,753.  Specification of Letters Patent.  Patented Sept. 10, 1918.

Application filed January 11, 1918. Serial No. 211,335.

*To all whom it may concern:*

Be it known that I, ERDIX N. ROUNDS, a citizen of the United States, residing at Owensboro, in the county of Daviess and the State of Kentucky, have invented certain new and useful Improvements in Transmission-Gearing, of which the following is a specification.

My invention relates to an improvement in a transmission gear having two rotating motions, one with the prime mover and one reverse to the prime mover.

This transmission gear is an improvement on Patent #1,041,877, issued to Erdix Rounds, on Oct. 22, 1912, entitled "Gearing." In this improved device the clutch bowls, in the reverse, are secured to the driving and driven shafts and the driving and driven gears and expanding clutch members are secured to elongated sleeved disks, concentric with and journaling on driving and driven shafts. These expanding clutch members are the same as, in the said patented device, therefore description is omitted.

One of the objects of my invention is to provide a transmission gear wherein the driving and driven reverse gears, the driving and driven reverse clutch expanding bands, and the levers and collars actuating the expanding clutch members are assembled on elongated sleeved disks, concentric on the driving and the driven shafts; in order that the entire reverse gearing and engaging mechanism will remain idle at all times except when engaged in the reverse rotation and thus eliminate centrifugal force in the reverse clutch bands and loss of power through their dragging against the clutch bowls.

Another object of my invention is to provide a transmission gear wherein the reverse clutch bowls are rigidly secured to the driving and driven shafts; in order to retain these bowls in true alinement by preventing them from dragging on the expanding clutch bands or being forced out of line through their engagement.

Another object of my invention is to provide a transmission gear wherein the said clutch bowls will retain said elongated sleeved disks and frictional clutch engaging mechanism in true position.

The features of my invention are more fully set forth in the description of the accompanying drawings, forming a part of this specification, in which:—

Figure 1 is a side view of control lever L and the external parts through which the desired rotative elements are engaged. Fig. 2 is a one half sectional view through line AA, looking from right to left in Fig. 4. Fig. 3 is a top plan view with upper sheet metal casing removed. Fig. 4 is a vertical view, sectional for the casing throughout and sectional for the internal parts between the centers of the driving and driven shafts, ES and TS, and the center of the parallel shaft CS.

While my invention is primarily adapted for use in connection with marine explosive engines of two speeds or two motions, it is obvious, however, that the same could be applied to various uses, and the general arrangement varied, without departing from the features of my invention.

In Fig. 1 control lever L is integral with levers $L^2$ and $L^3$ and secured to shaft $S^2$. Lever $L^1$ is secured to shaft $S^1$ and connected through connecting link CL to control lever L. The motions of control lever L are imparted equally to shafts $S^1$ and $S^2$, through lever $L^1$ and connecting link CL. Gear-segment lever $L^3$ meshes into gear-segment lever $L^4$ which is secured to shaft $S^3$, and through these gear-segment levers a reverse motion is imparted to shaft $S^3$ to that of $S^1$ and $S^2$. Shafts $S^1$, $S^2$, and $S^3$ pass transversely through, and are journaled in the bottom casing BC. On the interior secured in pairs to these transverse shafts $S^1$, $S^2$, and $S^3$ are fingers F extending into annular grooves in collars $C^1$, $C^2$, and $C^3$; these collars have an extension on one side to slide under and actuate the expanding levers CD, which are in pairs and swing on pins PS in disks $P^1$, $P^2$, and $P^3$. Opposite pins PS are pins over which a slot in clutch bands CD are fitted and retained in position by screws SS. The view of sectional parts in clutch bowl $B^1$ shows the pin in the clutch band slot; view of sectional parts in clutch bowls $B^2$ and $B^3$ shows pins on which expanding levers CD swing.

Disk $P^1$, on which is mounted expanding clutch members, has an elongated sleeve on one side on which sliding collar $C^1$ operates and on the outer end of said sleeve is secured the driving gear $G^2$. Inside of this elongated sleeve, at the ends, are bearings BB and this entire mechanism is concentric on driving shaft ES, free to rotate and idle at all times except when engaged in the reverse rotation. Clutch bowls $B^1$ and $B^2$ are integral and are secured to the right end of driving shaft ES; thus clutch bowl $B^1$ retains in position the above described elongated sleeved disk mechanism and completes the reverse driving gear mechanism.

The reverse driven gear mechanism is similar to the reverse driving gear mechanism. Disk $P^3$, on which is mounted expanding clutch members, has an elongated sleeve on one side on which sliding collar $G^3$ operates and on the outer end of said sleeve is secured the driven gear $G^5$. Inside of this elongated sleeve, at the ends, are bearing BB and this entire mechanism is concentric on driven shaft TS, free to rotate and idle at all times except when engaged in the reverse rotation. Clutch bowl $B^3$ is secured to driven shaft TS and thus retains in position the above described elongated sleeved disk mechanism and completes the reverse driven gear mechanism.

Gears $G^1$ and $G^3$ are secured to a parallel shaft CS which is journaled in end bearing plates FP and RP; gear $G^1$ meshes into driving gear $G^2$ and thus a reverse rotation is imparted to gears $G^1$ and $G^3$ to that of driving gear $G^2$. Intermediate gear $G^4$ revolves on intermediate gear pin GP, which is secured in bearing plate RP by nut PN, and meshes into gears $G^3$ and $G^5$ thus imparting to the driven gear $G^5$ the same rotation as that of $G^3$. Thus through the engagement of the clutch mechanisms, driving and driven, and the gears $G^2$, $G^1$, $G^3$, $G^4$, and $G^5$ the reverse rotation is obtained.

Disk $P^2$ is secured to the left end of the driven shaft TS and has a hub projection concentric in recess bearing BB in clutch bowl $B^2$; through this bearing the ends of driving and driven shafts are retained in alinement. The two shafts ES and TS are frictionally engaged through the clutch members on disk $P^2$ in clutch bowl $B^2$, which is secured to shaft ES, thus completing the direct engaging mechanism.

Driving shaft ES is journaled between bottom casing BC and bearing plate FP. Driven shaft TS is journaled between bottom casing BC and bearing plate RP, and is provided with a series of annular flanges journaling in grooves formed in the bearing to relieve the clutch and gearing mechanism of end thrusts incident to marine service.

The casing of this transmission is very simple, consisting of four parts. The main bottom casing BC and the end plates FP and RP are castings in which are journaled the shafts ES, TS, $S^1$, $S^2$, $S^3$, and CS. Between the end plates FP and RP is a sheet metal casing covering the sides and top and extending down into the bottom casing, this sheet metal casing can be quickly removed for access to the interior.

Control lever L and actuating parts are shown in central or neutral position. Forcing lever L to the left will, through shaft $S^2$, arms $A^2$ and fingers F, slide collar $C^2$ under expanding levers CD, thus engaging the direct rotative elements. Forcing lever L to the right will through connecting link CL, shaft $S^1$, arms $A^1$ and fingers F, slide collar $C^1$ under expanding levers CD in the reverse driving mechanism. Through the action of gear-segment levers $L^3$ and $L^4$, shaft $S^3$, arms $A^3$ and fingers F will slide collar $C^3$ under expanding clutch levers CD in reverse driven mechanism, thus producing in driven shaft TS reverse rotation to that of driving shaft ES through gears $G^1$, $G^2$, shaft CS, and gears $G^3$, $G^4$, and $G^5$.

According to the illustrated gearing arrangement, the clutch mechanism reverses at the same speed as the driving or forward motion but it can be geared to either increase or diminish the speed of the driven shaft. Though the friction band type of clutch is shown in the illustration any type of clutch may be used.

Having described my invention, I claim:—

In a reversing mechanism, the combination of driving and driven shafts, clutch mechanism for connecting the driving and driven shafts comprising a member fixed to the driving shaft and a coöperating actuatable member fixed to the driven shaft, other clutch mechanisms on the driving and driven shafts comprising members fixed to the respective shafts and actuatable members loose with respect to the shafts, a reversing train connecting the last mentioned actuatable members, a transverse rock shaft for each actuatable clutch member, actuating means between each rock shaft and its actuatable clutch member, a lever fixed to one rock shaft, a crank arm fixed to a second rock shaft, a link connection between the lever and crank arm, and a geared connection between a third rock shaft and one of the other two rock shafts.

ERDIX N. ROUNDS.

Witnesses:
C. W. KIMBERLIN,
HENRY MARTIN.